United States Patent
Aissi et al.

(10) Patent No.: US 8,452,012 B2
(45) Date of Patent: *May 28, 2013

(54) USING A TRUSTED-PLATFORM-BASED SHARED-SECRET DERIVATION AND WWAN INFRASTRUCTURE-BASED ENROLLMENT TO ESTABLISH A SECURE LOCAL CHANNEL

(75) Inventors: Selim Aissi, Beaverton, OR (US); Sundeep Bajikar, Santa Clara, CA (US); Sameer Abhinkar, Beaverton, OR (US); Scott Blum, Beaverton, OR (US); Jane Dashevsky, Beaverton, OR (US); Abhay Dharmadhikari, Beaverton, OR (US); Benjamin Matasar, Portland, OR (US); Mrudula Yelamanchi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,848

(22) Filed: Sep. 16, 2011

(65) Prior Publication Data
US 2012/0027209 A1 Feb. 2, 2012

Related U.S. Application Data

(63) Continuation of application No. 11/322,941, filed on Dec. 30, 2005, now Pat. No. 8,027,472.

(51) Int. Cl.
| | | |
|---|---|---|
| H04K 1/00 | (2006.01) |
| H04L 9/32 | (2006.01) |
| H04L 9/08 | (2006.01) |
| H04M 1/66 | (2006.01) |
| H01R 24/00 | (2006.01) |
| G06F 7/04 | (2006.01) |
| G06F 21/00 | (2006.01) |
| H04L 9/00 | (2006.01) |
| G06F 15/177 | (2006.01) |

(52) U.S. Cl.
USPC ............. 380/249; 380/28; 380/270; 380/286; 726/27

(58) Field of Classification Search
USPC ...... 380/249, 270, 28, 286; 713/168; 439/633; 455/411; 726/27
See application file for complete search history.

(56) References Cited

U.S. PATENT DOCUMENTS
7,444,512 B2 * 10/2008 Brickell ...................... 713/168
7,636,844 B2    12/2009 Bajikar
(Continued)

FOREIGN PATENT DOCUMENTS
CN        1296592 A      5/2001
CN      101026450 A      8/2007
(Continued)

OTHER PUBLICATIONS

Katelin A. Bailey, Sean W. Smith; "Trusted virtual containers on demand"; Oct. 2010; STC '10: Proceedings of the fifth ACM workshop on Scalable trusted computing; Publisher: ACM; pp. 63-72.*

(Continued)

*Primary Examiner* — Andrew L Nalven
*Assistant Examiner* — Courtney Fields
(74) *Attorney, Agent, or Firm* — Barnes & Thornburg LLP

(57) ABSTRACT

A system and method for establishing a connection on a mobile computing device includes generating a secret on a trusted platform of the mobile computing device. The secret is transported to a subscriber identity module (SIM)/Smartcard on the mobile computing device. A secure local communication channel is established between the trusted platform and the SIM/Smartcard using the secret.

20 Claims, 4 Drawing Sheets

U.S. PATENT DOCUMENTS

| | | |
|---|---|---|
| 8,027,472 B2 | 9/2011 | Aissi et al. |
| 2003/0046542 A1 | 3/2003 | Chen et al. |
| 2003/0220022 A1 | 11/2003 | Kawaguchi et al. |
| 2005/0108532 A1 | 5/2005 | Bajikar |
| 2005/0216736 A1 | 9/2005 | Smith |
| 2006/0039564 A1 | 2/2006 | Rao |
| 2006/0085848 A1 | 4/2006 | Aissi et al. |
| 2006/0293028 A1* | 12/2006 | Gadamsetty et al. ......... 455/411 |

FOREIGN PATENT DOCUMENTS

| | | | |
|---|---|---|---|
| EP | 1549019 A1 | | 6/2005 |
| EP | 1903463 A1 | * | 3/2008 |
| JP | 2003179592 A | | 6/2003 |
| JP | 4783433 B2 | | 9/2011 |
| WO | 99/52066 A1 | | 10/1999 |
| WO | 2004/036467 A1 | | 4/2004 |
| WO | 2005/033914 A1 | | 4/2005 |
| WO | 2006/042469 A1 | | 4/2006 |
| WO | 2006039616 A1 | | 4/2006 |
| WO | 2007/078918 A2 | | 7/2007 |
| WO | 2007/078918 A3 | | 9/2007 |

OTHER PUBLICATIONS

Max Landman; "Managing smart phone security risks"; Oct. 2010; InfoSecCD '10: 2010 Information Security Curriculum Development Conference; Publisher: ACM; pp. 145-155.*

Office action received for European Patent Application No. 06845732.4 mailed on Oct. 7, 2009, 3 pages.

Office Action Received for Chinese Patent Application No. 200610064164.6 mailed on Aug. 21, 2009, 8 pages of Office Action and 15 pages of English Translation.

Office Action Received for Chinese Patent Application No. 200610064164.6 mailed on Jun. 9, 2010, 8 pages of Office Action and 10 pages of English Translation.

Office Action received for Japanese Patent Application No. 2008-538128 mailed on Jan. 18, 2011, 3 pages of Office Action and 4 pages of English Translation.

"3rd Generation Partnership Project; Technical Specification Group Terminals; Security mechanisms for the SIM application toolkit", Stage 2 (Release 1999), 3GPP TS 03.48 V8.9.0, Jun. 2005, pp. 1-32.

Ikeno et al, "Modern Cryptographic Theory", Nov. 15, 1997, pp. 175-186.

International Preliminary Report on Patentability for PCT Patent Application No. PCT/US2006/048272, mailed on Jul. 10, 2008, 8 pages.

International Search Report and Written Opinion received for PCT Patent Application No. PCT/US2006/048272, mailed on Jul. 23, 2007, 12 pages.

Hoang et al, "Secure roaming with identity metasystems", IDtrust '08: Proceedings of the 7th symposium on Identity and trust on the Internet, Publisher: ACM, Mar. 4-6, 2008, pp. 36-47.

Office Action Received for Chinese Patent Application No. 200610064164.6 mailed on Nov. 22, 2011, 4 pages of Office Action and 6 pages of English Translation.

European Search Report received for European Patent App. No. 11008258.3-2413, mailed Jan. 12, 2012, 3 pages.

Official Communication received for European Patent App. No. 11008258.3-2413, mailed Feb. 13, 2012, 2 pages.

Official Communication received for European Patent App. No. 06845732.4-2413, mailed Dec. 19, 2011, 4 pages.

Office Action received for Chinese Patent App. No. 200610064164.6, mailed May 20, 2011, 7 pages Office Action, 3 pages unofficial English Summary, and 10 pages unofficial English translation.

Official Communication received for European Patent App. No. 06845732.4-2413, mailed May 24, 2012, 6 pages.

Official Communication received for European Patent App. No. 11008258.3-2413, mailed May 24, 2012, 5 pages.

Office Action received in Japanese Patent Application No. 2011-090926, mailed Jan. 15, 2013, 3 pages of Japanese Office Action and 6 pages of unofficial English translation.

* cited by examiner

USING A TRUSTED-PLATFORM-BASED SHARED-SECRET DERIVATION AND WWAN INFRASTRUCTURE-BASED ENROLLMENT TO ESTABLISH A SECURE LOCAL CHANNEL

CROSS-REFERENCE TO RELATED U.S. PATENT APPLICATION

This application is a continuation application of U.S. application Ser. No. 11/322,941, entitled "USING A TRUSTED-PLATFORM-BASED SHARED-SECRET DERIVATION AND WWAN INFRASTRUCTURE-BASED ENROLLMENT TO ESTABLISH A SECURE LOCAL CHANNEL," which was filed on Dec. 30, 2005.

This application is also related to U.S. patent application Ser. No. 10/969,739, entitled "A Method and Apparatus for Securing Communications Between a Smartcard and a Terminal," which is assigned to the assignee of the present invention and was filed on Oct. 19, 2004; and to U.S. patent application Ser. No. 10/715,970, now U.S. Pat. No. 7,636,844, entitled "Method and System to Provide a Trusted Channel Within a Computer System for a SIM Device," which is assigned to the assignee of the present invention and was filed on Nov. 17, 2003.

BACKGROUND

1. Field of the Disclosure

The present invention is generally related to the field of trusted computing. More particularly, the present invention is related to a system and method for using a trusted-platform-based shared-secret derivation and GSM infrastructure-based enrollment to establish a secure local channel.

2. Description

With network convergence, emerging devices such as, but not limited to, notebooks, personal digital assistants, and other consumer computing devices, will be supporting several network access capabilities, such as, for example, 802.11, 802.16, GPRS (General Packet Radio Service), GSM (Global Systems for Mobile Communications), etc., to the Internet as well as to private corporate networks. However, several credentials such as, for example, user, corporate, or mobile network operator credentials, may remain stored on a subscriber identity module (SIM) or smart card because of their tamperproof features, cryptographic capabilities, take-away factor, or a Mobile Network Operator's business requirements to own part of the SIM/smartcard and to control the enrollment of its functions.

It is therefore critical that such devices have sufficient security when transferring credentials between a SIM/smart card and secure applications running on a Trusted Partition. However, in order to establish a trusted channel between the two entities, both the SIM/smartcard and the trusted application must have some shared security parameters.

Thus, what is needed is a system and method for establishing a trusted channel between a SIM/smart card and a trusted platform. What is also needed is a system and method that establishes the trusted channel by securely enrolling Shared Secrets between the SIM/smartcard and the trusted platform. What is further needed is a system and method that establishes a Shared Secret definition that provides anonymous identification of platform validity and trust.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE DRAWINGS

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for establishing a secure local channel between a SIM/Smartcard and a Trusted-Platform using a WWAN (Wireless Wide-Area-Network) Infrastructure. This is accomplished by provisioning a shared-secret in an open platform using 3G (Third Generation of Mobile Communications Technology) security infrastructure. With embodiments of the present invention, the Trusted-Platform may provide attestation to the 3G security infrastructure and facilitate provisioning of security parameters for a plurality of interesting services, including Digital Rights Management (DRM).

Embodiments of the present invention enable a mobile network operator (MNO) to be in full control of the shared-secret provisioning. They can execute a shared secret as often as they so desire. Mobile network operators are provided a trusted partition on the Trusted-Platform where mobile applications can be securely executed.

Although embodiments of the present invention are described using a notebook computing device in a GSM environment, the invention is not limited to notebooks or to the GSM environment. One skilled in the relevant art(s) would know that other computing devices having a Trusted-Platform capable of generating security parameters and a SIM/smartcard or the like may be used in other types of mobile networks, such as, for example, a 3G (Third Generation) mobile network, without departing from the scope of this invention.

Figure 1:
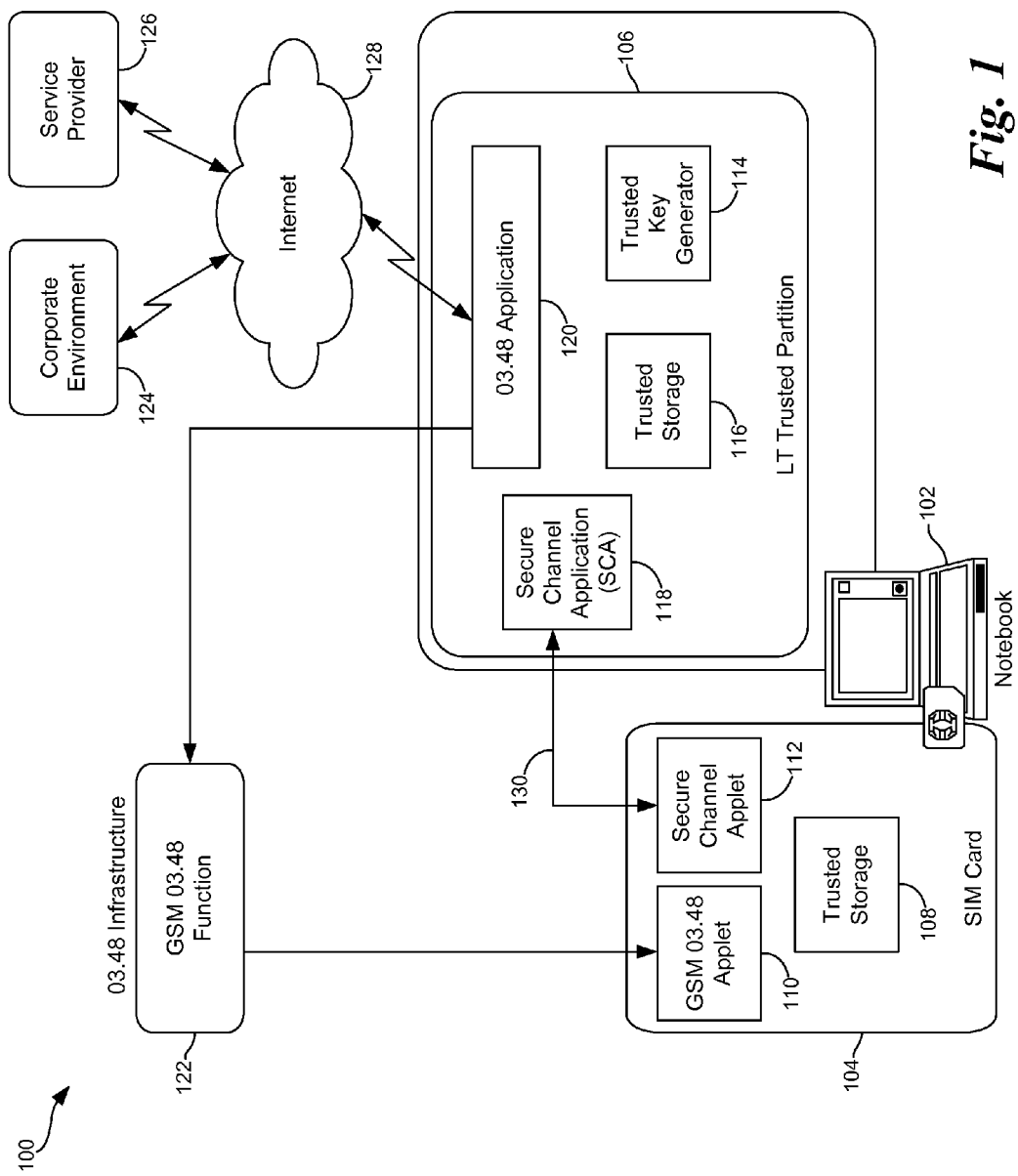
FIG. 1 is a high level block diagram illustrating an exemplary notebook in which a secure local channel between a SIM/Smartcard and a trusted partition is established in a GSM Infrastructure according to an embodiment of the present invention.

FIG. 1 is a high level block diagram 100 illustrating an exemplary notebook in which a secure local channel between a SIM/Smartcard and a trusted partition is established in a GSM (Global Systems for Mobile Communications) Infrastructure according to an embodiment of the present invention. Diagram 100 comprises, inter alia, a notebook 102 and a GSM 03.48 Infrastructure 122. $3^{rd}$ *Generation Partnership Project; Technical Specification Group Terminals; Security mechanisms for the SIM application toolkit; Stage* 2 (*Release* 1999), developed within the $3^{rd}$ Generation Partnership Project (3GPP™) (1999).

Notebook 102 comprises Trusted Platform architecture. Trusted Platform architecture provides an extensible security framework to enable a wide array of security services that help to support platform trust operations, security protocols, access control mechanisms, protection of private data, etc. through the use of a Trusted Platform Module or TPM (not explicitly shown). The TPM is basically a secure micro-controller with added cryptographic functionalities. The TPM hardware and supporting software and firmware provide the platform root of trust. The TPM is able to extend its trust to other parts of the platform by building a chain of trust, where each link extends its trust to the next one.

Notebook 102 includes a Trusted Partition 106 on the Trusted Platform. Trusted Partition 106 is provided to enable an operator to securely execute mobile applications, such as, for example, GSM 03.48 applications on the Trusted Platform. Trusted Partition 106 includes, inter alia, a Trusted Key Generator (TKG) 114, a Trusted Storage (TS) 116, and two applications: (1) a Secure Channel Application (SCA) 118, and (2) a GSM 03.48 application 120.

TKG 114 may be used to provision security parameters. In an embodiment of the present invention, TKG 114 may be used to generate the shared secret for establishing the secure local channel between SIM card 104 and Trusted Partition 106.

TS 116 may be used to securely store information for Trusted Partition 106. In an embodiment of the present invention, TS 116 may be used to securely store the shared secret generated by TKG 114.

SCA 118 is an application for establishing the secure local channel between Trusted Partition 106 and SIM card 104. GSM 03.48 application 120 is an application for establishing secure end-to-end communications between GSM system 122 and Trusted Partition 106 via an over-the-air interface. GSM 03.48 application 120 may be considered as a proxy for mobile network operator's (MNO's) 03.48 security infrastructure. GSM 03.48 application also enables communications between the service provider that owns the GSM network (shown as Service Provider 126) and notebook 102 over Internet 128. Service Provider 126 may also be referred to as a Wireless Provider, a Wireless Carrier, or a Wireless Operator.

In an embodiment in which notebook 102 is operating within a Corporate Environment, such as Corporate Environment 124, GSM 03.48 application 120 may be used to communicate within Corporate Environment 124 via Internet 128. In this instance, provisioning of the shared secret may occur within Corporate Environment 124.

Notebook 102 also includes a SIM (subscriber identity module) card 104 or UICC (Universal Integrated Circuit Card) for ensuring the integrity and security of all kinds of personal data. SIM card 104 comprises, inter alia, a Trusted Storage (TS) 108, a GSM 03.48 applet 110, and a secure channel applet 112.

TS 108 may be used to securely store information for SIM card 104. In an embodiment of the present invention, TS 108 may be used to securely store the shared secret generated by TKG 114 of Trusted Partition 106.

GSM 03.48 applet 110 is a program for establishing secure end-to-end communications between GSM system 122 and SIM card 104 via an over-the-air interface. In one embodiment, SIM card 104 may receive the shared secret from 03.48 Infrastructure 122. In yet another embodiment, SIM card 104 may receive the shared secret via a Diffie-Hellman key exchange performed by Trusted Partition 106. In this instance, SIM card 104 communicates the shared secret to GSM system 122 via GSM 03.48 applet 110.

Secure channel applet 112 is a program for establishing the secure local channel between SIM card 104 and Trusted Partition 106.

In order for Trusted Partition 106 and SIM card 104 to communicate with each other, a secure local channel 130 (shown in phantom in FIG. 1) between the two entities must be established. Before secure local channel 130 may be established, the two entities must trust one another. To establish the trust, a secret that is shared by the two entities must be generated by one entity and securely passed to the other entity. In one embodiment of the invention, Trusted Partition 106 generates the shared secret and passes the shared secret to SIM card 104 via an existing secure infrastructure, namely GSM 03.48 infrastructure 122.

Figure 2:
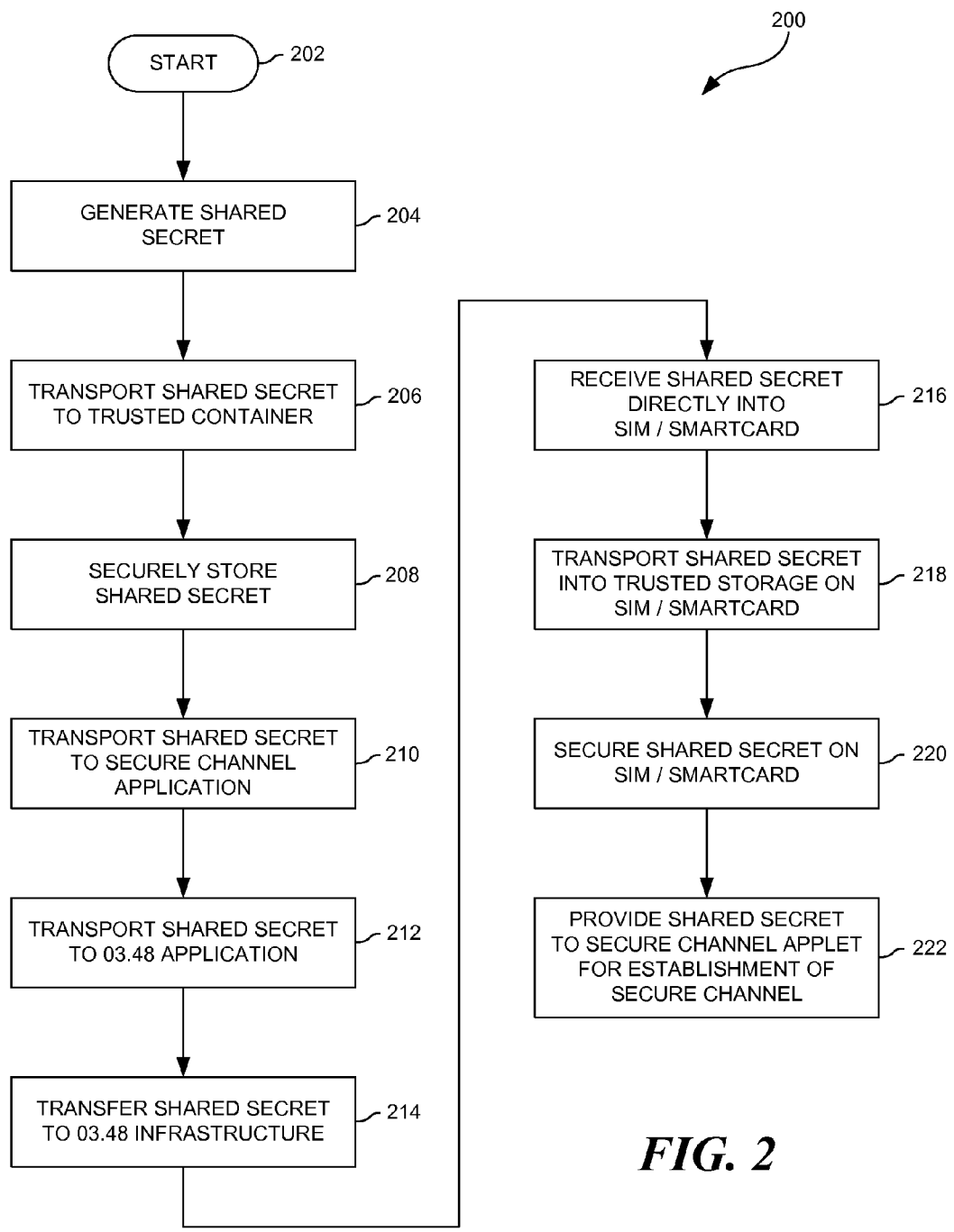
FIG. 2 is a flow diagram describing an exemplary method for establishing a secure local channel between a SIM/Smartcard and a Trusted-Platform in a GSM Infrastructure according to an embodiment of the present invention.

FIG. 2 is a flow diagram describing an exemplary method for establishing a secure local channel between a SIM/Smartcard and a Trusted-Platform in a GSM Infrastructure according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, a shared secret (SS) is securely generated in the trusted platform. In one embodiment, the shared secret is session-based so that if it is compromised, future sessions are not exposed. The shared secret may be defined as:

$$SS = RAND \| K_{PlatformTrust} \| K_{PlatformIdentity} \| TimeStamp$$

where: RAND is a high-entropy random number; $K_{PlatformTrust}$ is a key that is derived from a specific measure of the platform state; $K_{PlatformIdentity}$ is a key that anonymously represents a platform identity; and TimeStamp is a time/date stamp.

By using concatenation to derive the SS, the identity of the platform is never exposed. In one embodiment, the high-entropy random number may be generated by a hardware-based true random-number generator. Both $K_{PlatformTrust}$ and $K_{PlatformIdentity}$ may be derived using software, hardware, or firmware. In one embodiment, $K_{PlatformIdentity}$ may be derived from an AIK (Attestation Identity Key). AIKs are derived from the Trusted Platform Module (TPM) and are used to provide platform authentication to various outside entities, such as, for example, service providers.

As indicated above, a timestamp is included as part of the concatenation operation for generation of the shared secret. By including a timestamp as part of the shared secret, replay attacks may be prevented.

In one embodiment, the shared secret may be generated using the TPM. After the shared secret is generated, the process proceeds to block 206.

In block 206, the shared secret is transported to a Trusted Storage container. In one embodiment, the container may be a TPM (Trusted Platform Module) PCR (Platform Configuration Register). In another embodiment, the container may be a FLASH storage device or any other storage device capable of being sealed. The process then proceeds to block 208.

In block 208, the shared secret is securely stored in the Trusted Storage device by performing a sealing function. In one embodiment, the storage device may be sealed by the TPM. Sealing the storage device shields the shared secret from attack while in use or stored. The process then proceeds to block 210.

In block 210, the shared secret is transported to the Secure Channel Application (SCA). The SCA is one of the endpoints for the secure local channel to be established between the SIM card and the Trusted Partition. The process then proceeds to block 212.

In block 212, the shared secret is transported to the 03.48 application running on the Trusted Partition. In one embodiment, blocks 210 and 212 may be performed simultaneously.

Once the shared secret is available to the 03.48 application, the MNO's infrastructure may obtain it via a secure over-the-air 03.48 process and securely store the shared secret (block 214). Now the shared secret is shared with the Service Provider for storage, management, and verification by the Service Provider. This process is well known to those skilled in the relevant art(s). The process then proceeds to block 216.

In block 216, the shared secret is transported directly into the SIM card file system from the 03.48 Infrastructure using a pre-existing GSM 03.44 secure channel. *Digital cellular telecommunications system* (*Phase* 2+); *Support of Teletex in a GSM Public Land Mobile Network* (*PLMN*), GSM 03.44 version 7.0.0 Release 1998), published by the European Telecommunications Standards Institute (1999). The shared secret is immediately transported to trusted storage on the SIM card in block 218.

In block 220, the shared secret is securely stored on the card. This may include sealing the storage container in which the shared secret is stored. Once the shared secret is securely stored on the SIM card, the shared secret is sent to the secure channel applet for establishing the secure local channel (block 222). At this point, both the SIM card and the SCA have the same shared secret. A Transport Layer Security (TLS)-based handshake may now take place to establish the secure local channel. A TLS-based handshake is well known to those skilled in the relevant art(s).

In some instances, the Trusted Partition of a notebook or other computing device may not include a 03.48 application. In this instance, the shared secret must be passed to the SIM card via a route other than the GSM 03.48 Infrastructure. To accommodate the lack of a 03.48 application in a trusted partition of the computing device, in yet another embodiment of the present invention, the shared secret may be generated by the Trusted Partition and passed to the SIM card via a Diffie-Hellman key exchange. In embodiments in which the Diffie-Hellman key exchange is performed, both the Trusted Platform and the SIM/Smartcard must support Diffie-Hellman exponential operations.

Figure 3:
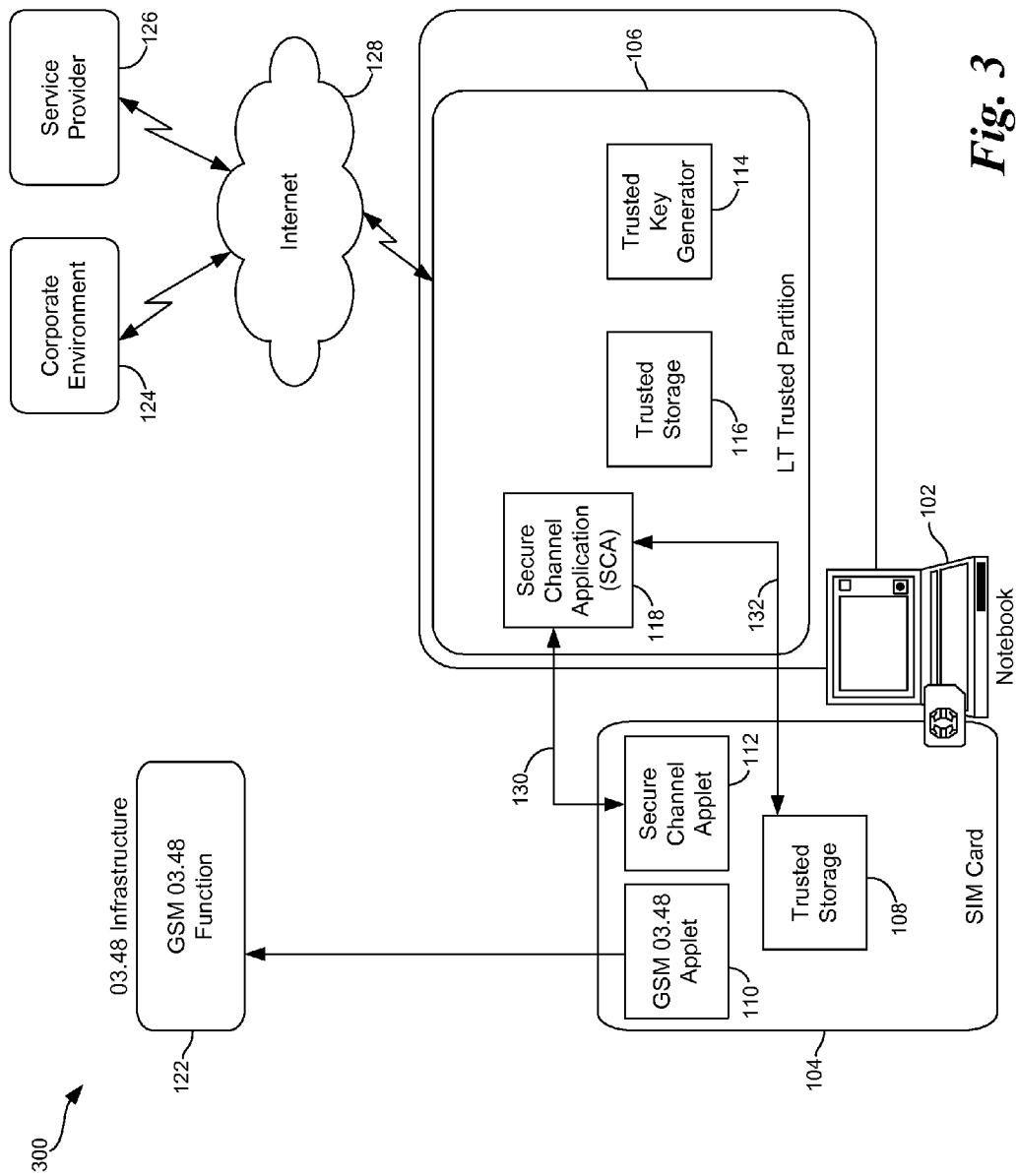
FIG. 3 is a high level block diagram illustrating an exemplary notebook in which a secure local channel between a SIM/Smartcard and a trusted partition is established in a GSM Infrastructure using a Diffie-Hellman key exchange according to an embodiment of the present invention.

FIG. 3 is a high level block diagram 300 illustrating an exemplary notebook in which a secure local channel between a SIM/Smartcard and a trusted partition is established in a GSM Infrastructure using a Diffie-Hellman key exchange according to an embodiment of the present invention. FIG. 3 is very similar to FIG. 1 except that instead of the 03.48 application being used to pass the shared secret from Trusted Partition 106 to SIM card 104 via 03.48 Infrastructure 122, an advanced Diffie-Hellman key exchange 132 is performed by Trusted Partition 106 to pass the shared secret to SIM card 104. A Diffie-Hellman key exchange, also referred to as an exponential key agreement, is a cryptographic protocol that allows two entities to exchange a secret key over an insecure communications channel without any prior knowledge of each other. The Diffie-Hellman key exchange is well known to those skilled in the relevant art(s). As shown in FIG. 3, the shared secret generated by Trusted Partition 106 is passed to SIM card 104 via communications channel 132. SIM card 104 communicates the shared secret to 03.48 Infrastructure 122 via GSM 03.48 applet 110.

Figure 4:
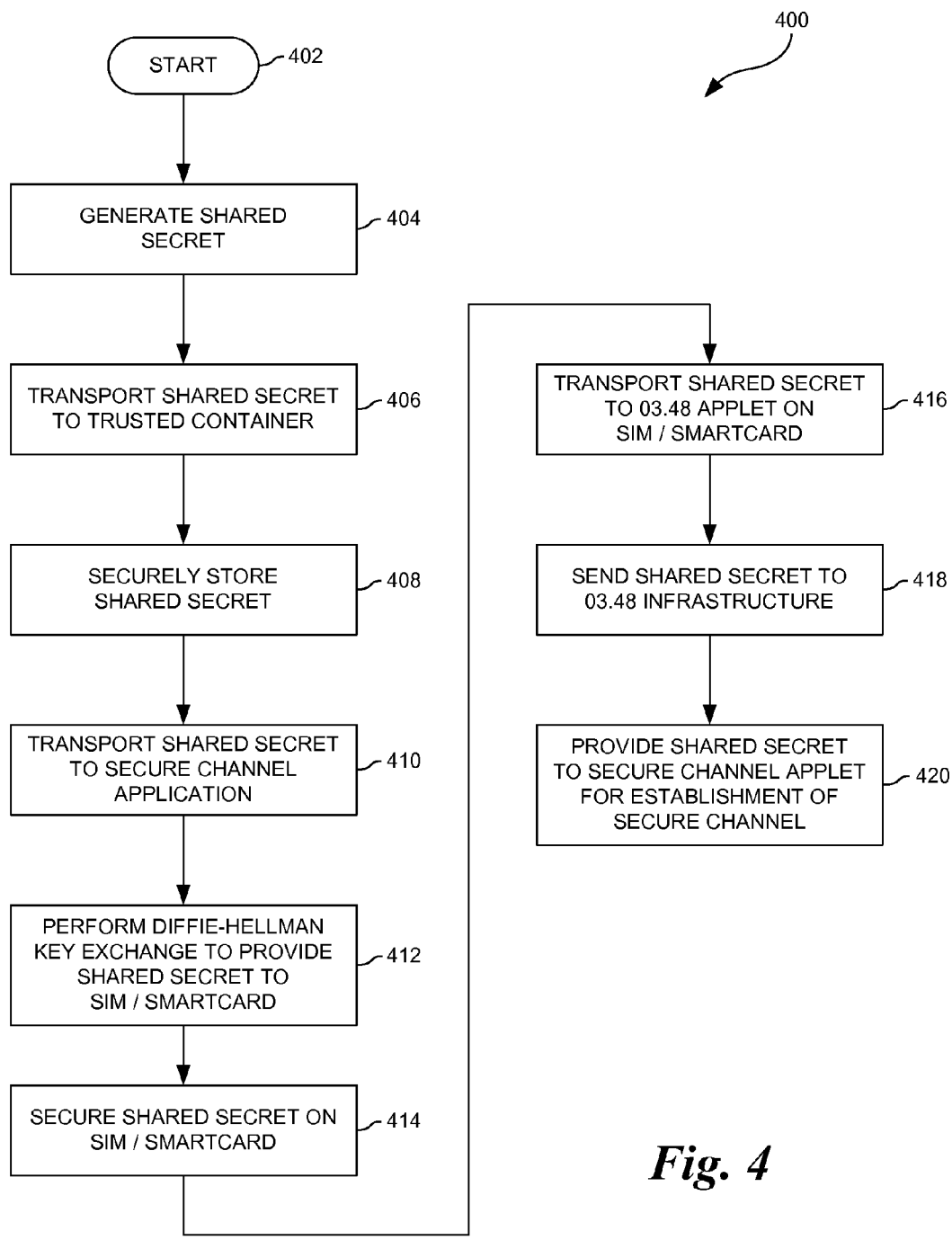
FIG. 4 is a flow diagram describing an exemplary method for establishing a secure local channel between a SIM/Smartcard and a Trusted-Platform in a GSM Infrastructure using a Diffie-Hellman key exchange according to an embodiment of the present invention.

FIG. 4 is a flow diagram describing an exemplary method for establishing a secure local channel between a SIM/Smartcard and a Trusted-Platform in a GSM Infrastructure using a Diffie-Hellman key exchange according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to block 404.

In block 404, a shared secret (SS) is securely generated in the trusted platform. In one embodiment, the shared secret is session-based so that if it is compromised, future sessions are not exposed. The shared secret is defined in a similar manner as described above with reference to block 204 in FIG. 2. The process then proceeds to block 406.

In block 406, the shared secret is transported to a Trusted Storage container. In one embodiment, the container may be a TPM (Trusted Platform Module) PCR (Platform Configuration Register). In another embodiment, the container may be a FLASH storage device or any other storage device capable of being sealed. The process then proceeds to block 408.

In block 408, the shared secret is securely stored in the Trusted Storage device by performing a sealing function. In one embodiment, the storage device may be sealed by the TPM. Sealing the storage device shields the shared secret from attack while in use or stored. The process then proceeds to block 410.

In block 410, the shared secret is transported to the Secure Channel Application (SCA). Again, the SCA is one of the endpoints for the secure local channel to be established between the SIM card and the Trusted Partition. The process then proceeds to block 412.

In block 412, a Diffie-Hellman key exchange takes place between the Trusted Partition and the SIM card. The Diffie-Hellman key exchange is performed by the SCA. During this process the shared secret is passed to the SIM card over an unsecured communication channel. The process then proceeds to block 414.

In block 414, the shared secret is securely stored on the SIM card. This may include sealing the storage container in which the shared secret is stored. Once the shared secret is securely stored on the SIM card, the shared secret is sent to the GSM 03.48 applet (block 416) for enabling the shared secret to be passed to the GSM 03.48 Infrastructure (block 418) for storage, management, and verification by the Service Provider. The process then proceeds to block 420.

In block 420, the shared secret is passed to the secure channel applet for establishing the secure local channel. At this point, both the SIM card and the SCA have the same shared secret. A Transport Layer Security (TLS)-based handshake may now take place to establish the secure local channel.

Embodiments of the present invention may be implemented using hardware, software, or a combination thereof. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include a processor, a storage medium accessible by the processor (including volatile and non-volatile memory and/or storage elements), at least one input device, one or more output devices, and a network connection. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A method comprising:
    generating a secret on a trusted platform module (TPM) of a mobile computing device;
    transmitting the secret from the mobile computing device to a mobile service provider;
    receiving the secret from the mobile service provider with a subscriber identity module (SIM)/Smartcard of the mobile computing device; and
    establishing, on the mobile computing device, a secure local channel between the TPM and the SIM/Smartcard using the secret received from the mobile service provider.

2. The method of claim 1, wherein generating a secret on the TPM comprises:
    generating a random number on the TPM; and
    generating the secret on the TPM as a function of the random number.

3. The method of claim 1, wherein generating a secret on the TPM comprises:
    generating an Attestation Identity Key (AIK) on the TPM; and
    generating the secret on the TPM as a function of the AIK.

4. The method of claim 1, wherein establishing the secure local channel comprises sharing the secret between the TPM and the SIM/Smartcard.

5. The method of claim 1, wherein establishing the secure local channel between the TPM and the SIM/Smartcard comprises establishing a secure local channel between the TPM and the SIM/Smartcard via a Transport Layer Security (TLS)-based handshake between the TPM and the SIM/Smartcard.

6. The method of claim 1, further comprising:
    transporting the secret to a secure channel application on the TPM; and
    transporting the secret to a secure channel application on the SIM/Smartcard subsequent to receiving the secret with the SIM/Smartcard;
    wherein establishing the secure local channel comprises establishing a secure local channel between the TPM and the SIM/Smartcard using the secure channel applications.

7. The method of claim 1, further comprising storing the secret in a trusted container on the TPM.

8. The method of claim 7, wherein storing the secret comprises storing the secret in a Platform Configuration Register (PCR) of the TPM.

9. The method of claim 1, further comprising storing the secret in a trusted container on the SIM/Smartcard after receiving the secret from the mobile service provider with the SIM/Smartcard.

10. A mobile computing device comprising:
    a subscriber identity module (SIM)/Smartcard; and
    a trusted platform module (TPM) comprising (i) a trusted key generator to generate a secret, (ii) an application to pass the secret to the SIM/Smartcard, and (iii) a secure channel application to establish a secure local communication channel between the TPM and the SIM/Smartcard on the mobile computing device using the secret.

11. The mobile computing device of claim 10, wherein the application comprises a communication application to transmit the secret from the mobile computing device to a mobile service provider, wherein the SIM/Smartcard comprises a second communication application to receive the secret from the mobile service provider.

12. The mobile computing device of claim 11, wherein the SIM/Smartcard comprises a secure channel application to communicate with the secure channel application of the TPM to establish the secure local communication using the secret received from the mobile service provider.

13. The mobile computing device of claim 11, wherein the TPM comprises a trusted container in which the secret is stored after being generated.

14. The mobile computing device of claim 13, wherein the trusted container comprises a Platform Configuration Registers (PCR) of the TPM.

15. The mobile computing device of claim 10, wherein the SIM/Smartcard comprises a trusted container in which the secret is stored after the secret is passed to the SIM/Smartcard.

16. The mobile computing device of claim 10, wherein the secure channel application comprises a secure channel application to establish a secure local communication channel between the TPM and the SIM/Smartcard using a Transport Layer Security (TLS)-based handshake.

17. The mobile computing device of claim 10, wherein the application to pass the secret to the SIM/Smartcard comprises an application to perform a Diffie-Hellman key exchange between the TPM and the SIM/Smartcard.

18. One or more non-transitory machine readable media comprising a plurality of instructions that in response to being executed result in a mobile computing device:

generating a secret on a trusted platform module (TPM) of the mobile computing device;

passing the secret from the TPM to a subscriber identity module (SIM)/Smartcard of the mobile computing device; and establishing, on the mobile computing device, a secure local channel between the TPM and the SIM/Smartcard using the secret.

19. The one or more non-transitory machine readable media of claim 18, wherein passing the secret from the TPM to the SIM/Smartcard comprises:

transmitting the secret from the TPM of the mobile computing device to a mobile service provider; and receiving the secret from the mobile service provider with the SIM/Smartcard of the mobile computing device, wherein establishing the secure local channel comprises establishing, on the mobile computing device, a secure local channel between the TPM and the SIM/Smartcard using the secret received from the mobile service provider.

20. The one or more non-transitory machine readable media of claim 18, wherein passing the secret from the TPM to the SIM/Smartcard comprises performing a Diffie-Hellman key exchange between the TPM and the SIM/Smartcard.

* * * * *